No. 836,457. PATENTED NOV. 20, 1906.
J. PELLAR.
HOSE COUPLING.
APPLICATION FILED NOV. 14, 1905.
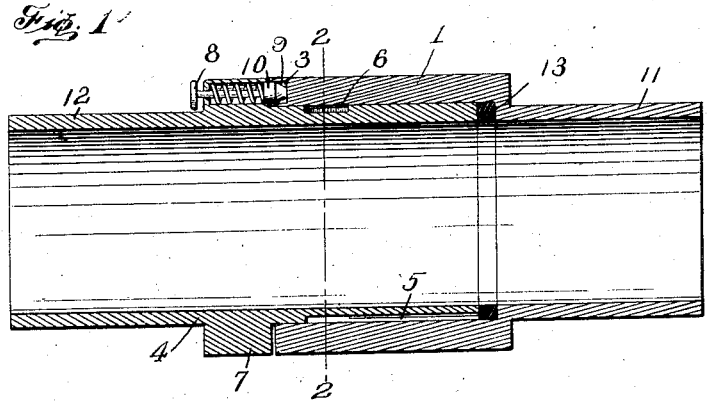
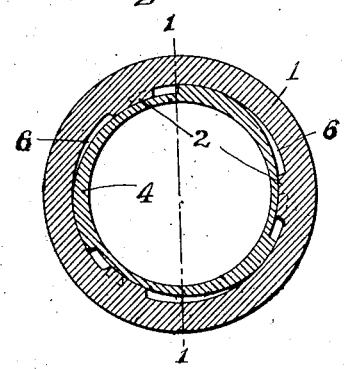
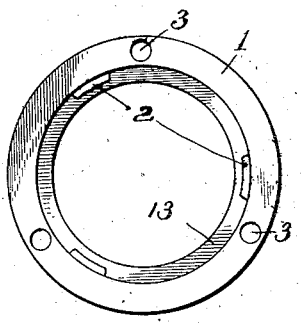
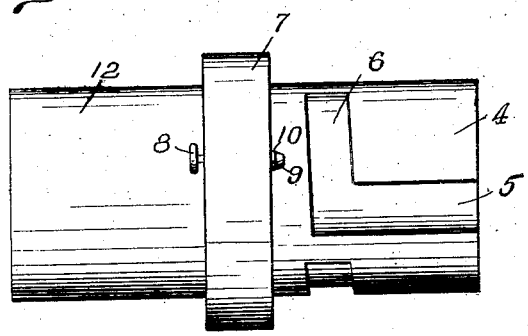
Inventor
Joseph Pellar.
Witnesses

UNITED STATES PATENT OFFICE.

JOSEPH PELLAR, OF IDAHO SPRINGS, COLORADO.

HOSE-COUPLING.

No. 836,457.	Specification of Letters Patent.	Patented Nov. 20, 1906.

Application filed November 14, 1905. Serial No. 287,258.

*To all whom it may concern:*

Be it known that I, JOSEPH PELLAR, a citizen of the United States, residing at Idaho Springs, in the county of Clear Creek and State of Colorado, have invented certain new and useful Improvements in Hose-Couplings, of which the following is a specification.

My invention relates to hose-couplings especially adapted for use by firemen; and it consists in the constructions, combinations, and arrangements herein described and claimed.

An object of my invention is to provide a simple and durable form of coupling which can be conveniently and quickly connected and opened by a slight relative movement of its parts.

A further object of my invention is to provide a strong coupling which will be automatically securely locked in coupled position.

In the accompanying drawings, forming a part of this application, and in which similar reference-symbols indicate corresponding parts in the several views, Figure 1 is an axial section taken on the line 1 1 of Fig. 2, showing one embodiment of my invention in its coupled position. Fig. 2 is a sectional view on the line 2 2 of Fig. 1. Fig. 3 is a side elevation of the male member shown in the above figures, and Fig. 4 is an end elevation of the coöperating female member.

Referring to the drawings, 1 indicates the female member of a coupling, having a plurality of projections 2 spaced uniformly about its inner periphery and provided with an equal number of similarly-spaced recesses 3 in its end surface.

A male member 4 is shown provided with a plurality of axially-extending recesses 5, which are equal in number to the projections 2 of the female member and properly spaced to receive these projections when the parts are brought together. Each groove 5 terminates in an axially inclined or curved groove 6, the grooves 6 tapering gradually in depth from the periphery of the member 4 to the bottom of the grooves 5, as shown especially in Fig. 2. This tapering of the grooves 6 provides them with bottoms eccentric to the axis of the male member 4, whereby the projections 2 will be forced into tight engagement with the bottoms of said grooves for augmenting the rigidity and strength of the coupling.

A flange 7 on the member 4 carries a spring-pressed locking-pin 8, which is so positioned relative to the grooves 6 that it will engage one of the recesses 3 when the parts of the coupling are connected together with the projections 2 in said grooves. The locking-pin 8 is shown provided with a head comprising a conical guiding portion 9 and a cylindrical locking portion 10. By this construction the conical portion 9 readily enters either of the recesses 3 brought adjacent thereto, and the cylindrical portion 10 is thereby guided into such recess for securely locking the two members against relative rotation.

The members 1 and 4 are provided, respectively, with a nipple 11 and 12, to which are clamped, or otherwise suitably secured, the ends of the hose lengths. A washer 13 is positioned against the nipple 11 of the member 1 for engaging the end of the member 4, said member being forced tightly against the washer by the engagement of the projections 2 with the axially-inclined grooves 6.

Having thus described my invention, what I claim as new, and desire to secure by Letters Patent, is—

1. In a hose coupling, the combination of two telescoping members, the first of said members provided with a series of projections and a similar series of recesses, the second of said members provided with a series of grooves for receiving said several projections, said grooves terminating in axially-inclined grooves provided with eccentrically-arranged bottoms for firmly engaging said projections, and a locking means carried by said second member for engaging one of the recesses in said first member, substantially as described.

2. In a hose-coupling, the combination of two telescoping members, the first of said members provided with a series of projections and a similar series of recesses, the second of said members provided with a series of grooves for receiving said several projections, said grooves terminating in axially-inclined grooves provided with eccentrically-arranged bottoms for firmly engaging said projections, and a locking-pin carried by the second of said members for engaging one of the recesses in the first member, said pin constructed with a conical end for guiding it into such recess and with a cylindrical portion for engaging said recess to securely lock the two members against relative rotation, substantially as described.

In testimony whereof I affix my signature in presence of two witnesses.

JOSEPH PELLAR.

Witnesses:
WM. BROAD,
JOHN TRATHER.